(12) United States Patent
Hao et al.

(10) Patent No.: US 9,106,476 B2
(45) Date of Patent: Aug. 11, 2015

(54) OPTIMIZING SELECTION OF A NETWORK FOR VIDEO STREAMING

(75) Inventors: Jack Jianxiu Hao, Lexington, MA (US); Ishan Awasthi, Wilmington, MA (US); Yuhui Qian, Lexington, MA (US); John F. Gallagher, Hopewell, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 174 days.

(21) Appl. No.: 13/267,945

(22) Filed: Oct. 7, 2011

(65) Prior Publication Data

US 2013/0091239 A1    Apr. 11, 2013

(51) Int. Cl.
*G06F 15/16* (2006.01)
*H04L 29/06* (2006.01)
*H04L 29/08* (2006.01)

(52) U.S. Cl.
CPC .......... *H04L 29/06326* (2013.01); *H04L 29/06* (2013.01); *H04L 29/06489* (2013.01); *H04L 29/08072* (2013.01)

(58) Field of Classification Search
CPC .......................... H04L 29/08072; H04L 29/06
USPC .................................................. 709/217–231
See application file for complete search history.

(56) References Cited

U.S. PATENT DOCUMENTS

| | | | |
|---|---|---|---|
| 2004/0192237 A1* | 9/2004 | Kayano et al. | 455/127.3 |
| 2004/0215978 A1* | 10/2004 | Okajo et al. | 713/201 |
| 2006/0206586 A1* | 9/2006 | Ling et al. | 709/219 |
| 2007/0226365 A1* | 9/2007 | Hildreth et al. | 709/231 |
| 2010/0265836 A1* | 10/2010 | Lau et al. | 370/252 |
| 2011/0060798 A1* | 3/2011 | Cho et al. | 709/206 |
| 2011/0119394 A1* | 5/2011 | Wang et al. | 709/231 |
| 2011/0151924 A1* | 6/2011 | Miller | 455/552.1 |
| 2011/0295982 A1* | 12/2011 | Misra | 709/220 |
| 2012/0051243 A1* | 3/2012 | Faye et al. | 370/252 |
| 2012/0058782 A1* | 3/2012 | Li | 455/456.2 |
| 2012/0062734 A1* | 3/2012 | Mironichev et al. | 348/143 |
| 2012/0064829 A1* | 3/2012 | Hart et al. | 455/41.2 |
| 2012/0191778 A1* | 7/2012 | Kim et al. | 709/204 |
| 2012/0271757 A9* | 10/2012 | Shakkarwar | 705/39 |
| 2012/0309430 A1* | 12/2012 | Ayalur et al. | 455/456.6 |
| 2013/0024539 A9* | 1/2013 | Khedouri et al. | 709/217 |
| 2014/0200030 A1* | 7/2014 | Barathalwar | 455/456.2 |

* cited by examiner

*Primary Examiner* — Chris Parry
*Assistant Examiner* — Weiwei Stiltner

(57) ABSTRACT

A method includes receiving a request to provide streaming video content from a user device. A location is identified for the user device. Available networks to deliver the streaming video content are identified based on the location of the at least one user device. Network preference for delivery of the streaming video content is identified. The method also includes selecting an optimal network for delivering the streaming video content based on the location of the at least one user device, the available networks and the network preference for delivery of the streaming video content. The method may also include providing the streaming video content using the optimal network.

19 Claims, 9 Drawing Sheets

OPTIMIZING SELECTION OF A NETWORK FOR VIDEO STREAMING

BACKGROUND INFORMATION

Video service providers currently provide multiple services, including live video, teleconferencing, cable television, and video chat services to their customers. In some instances, individual customers may receive combinations of these multiple services from a single video service provider. The video service providers may provide video services that may be accessed by customers using devices such as mobile telephones, personal computers, tablets, etc.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for selecting an optimal network for delivering streaming video content to a user device. Consistent with the embodiments described herein, an optimal network to deliver streaming video content to a user device may be determined based on an increasing order of preferences and available networks, such as from a mobile telecommunications network, such as a third generation mobile telecommunications (3G) or fourth generation mobile telecommunications (4G) network, a mobile wireless network or a landline wireless network.

Figure 1A:
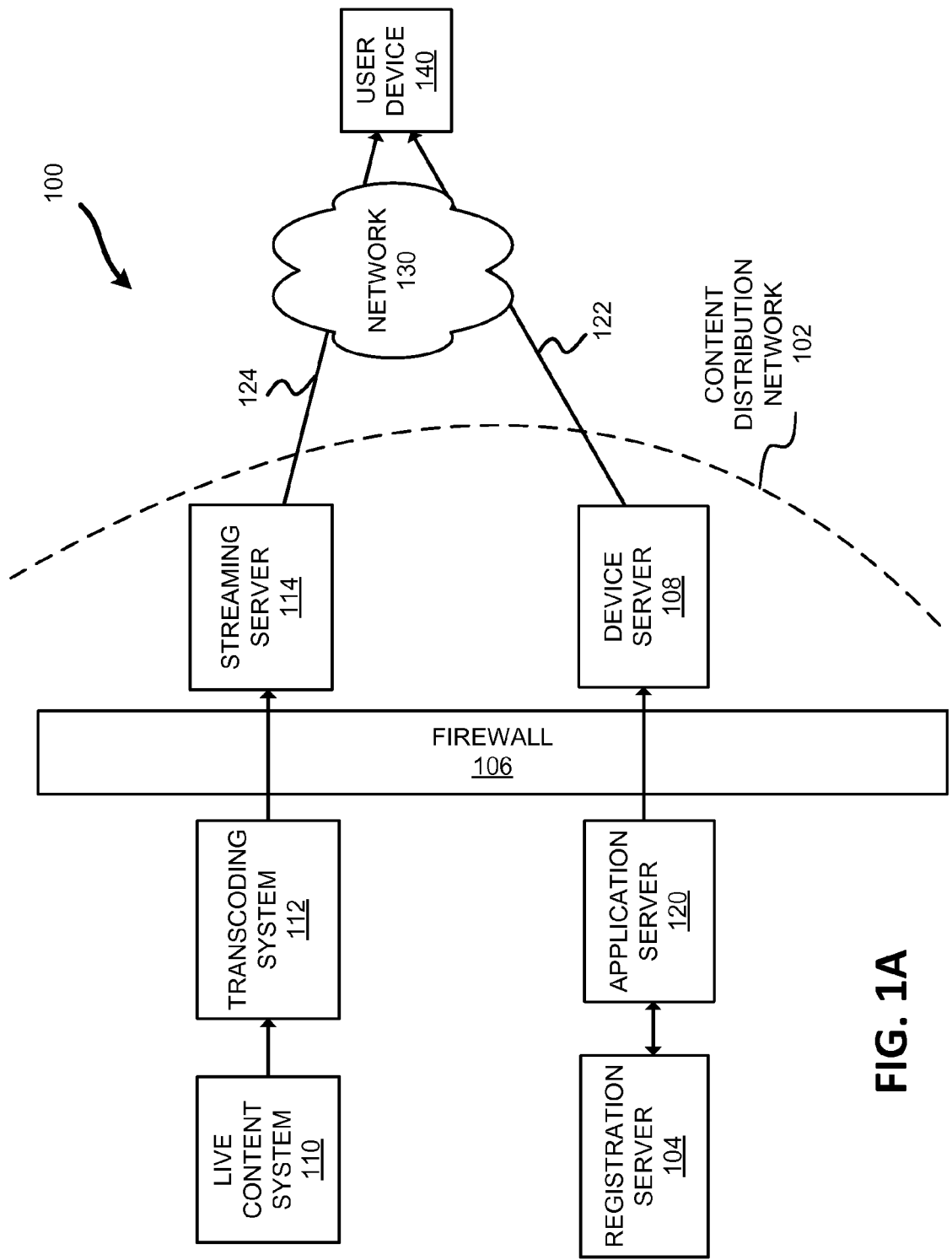
FIG. 1A illustrates an exemplary network in which systems and methods described herein may be implemented.

FIG. 1A is a diagram of an exemplary network 100 in which systems and/or methods described herein may be implemented. As illustrated, network 100 may include a content distribution network 102 and a user device 140. Content distribution network 102 may include a registration server 104, an application server 120, a device server 108, a live content system 110, a transcoding system 112 and a streaming server 114. Content distribution network 102 and user device 140 may be interconnected by network 130. Components of network 100 may be interconnected via wired and/or wireless connections. The configuration of components of network 100 illustrated in FIG. 1A is for illustrative purposes. Although not shown, content distribution network 102 may also include other components of a content distribution network for a live streaming video service provider, such as customer information servers, security devices, memory/storage devices, etc., and may manage the customer-provider relationship for many customers and user devices 140. Other configurations may be implemented. Therefore, network 100 may include additional, fewer, or different components than those depicted in FIG. 1A. Also, in some instances, one or more of the components of network 100 may perform one or more functions described as being performed by another one or more of the components of network 100.

User device 140 may include a device that is capable of receiving and playing streaming video content (e.g., a live video feed). For example, user device 140 may include a mobile device, such as a tablet, television (TV), personal computer (PC), video game console, or mobile telephone (e.g., a BlackBerry, Palm, Android, or iPhone operating system (iOS) handsets), etc. The streaming video content may include live video and/or audio content. User device 140 may be implemented in network 100 to receive the streaming video content from content distribution network 102. As described below, user device 140 may include a network optimization application that optimizes selection of a network to receive live streaming video based on an increasing order of preference from a mobile telecommunications network, such as a 3G or 4G network, a mobile wireless network (such as a Mi-Fi mobile hotspot) and a landline wireless network (such as a Wi-Fi network). In some implementations, user device 140 may also be capable of establishing a mobile wireless network that can be used by other user devices 140 to receive streaming video content from content distribution network 102.

Registration server 104 may provide registration services for user devices 140. Registration server 104 may generate a security protected webpage, such as a single sign-on (SSO) webpage, through which user device 140 may register with registration server 104 to receive streaming video content broadcast from content distribution network 102. Registration server 104 may support interaction with user device 140, providing registration and authentication services in conjunction with application server 120 and device server 108.

Application server 120 may support registration of user devices 140 and define network logic (e.g., rules for connecting user devices 140 to network 140) for user devices 140 that are to receive streaming video content from content distribution network 102. Application server 120 may define network logic for network 100 based on administrative input, network topology and/or business rules for content distribution network 102, such as a number of user devices 140 that may register or connect to a particular network in a region of network 100.

Device server 108 may control communication between user device 140 and content distribution network 102. For example, device server 108 may authenticate user devices 140 in conjunction with application server 120. In addition, device server 108, in conjunction with application server 120, may implement support for optimization of selection of a network to deliver streaming video content from content distribution network 102 to user device 140 as described below with respect to FIG. 1B.

Live content system 110 may broadcast a video feed. According to one embodiment, live content system 110 may include a capture card in a personal computer or a server that provides the video feed. The video feed may be a live streaming video feed and may be a digital or an analog video feed, depending on predetermined criteria, such as specifications of user device 140. The video feed may include videos from video conferencing applications, live video feeds, video monitoring applications, sports programs, live performance event video programs, live video or television, etc.

Transcoding system 112 may convert the video feed from live content system 110 to a format that user device 140 may receive and display. Transcoding system 112 may transcode the video feed into a particular format based on specifications or information received from user device 140, such as a type of operating system (e.g., iPhone format different from android format) or a particular application on user device 140 that may use the transcoded video content. For example, transcoding system 112 may transcode the video feed to a default format, such as H.264/MPEG4 Part 10 AVC (Moving Picture Experts Group Advanced Video Coding) at a bit rate of 256 kilobits per second (kbps).

Streaming server 114 may stream the transcoded video content to user devices 140 using a network selected by user device 140 and content distribution network 102. Streaming server 114 may be Internet facing (e.g., streaming server 114 may include a port directly connected to the Internet) and may provide a streaming uniform resource locator (URL) to deliver the video content (i.e., the transcoded video feed is provided as streaming video content that may be accessed through the streaming URL) directly to mobile user devices 140.

Streaming server 114 may provide the streaming URL to user device 140 based on a security protocol for network 100. Streaming server 114 may provide the streaming URL to user device 140 after user device 140 has been authenticated, for instance, by application server 120 in conjunction with device server 108, as described below.

Streaming server 114 may send a streaming URL associated with predetermined security features. For example, a streaming URL may be session based, i.e. each streaming URL may be used for a single session of video content streaming for user device 140. In some implementations, streaming server 114 may send a token associated with the streaming URL. The token may be used to limit usage of the streaming URL to a specified time (i.e., the token may terminate the session at a predetermined time).

Content distribution network 102 may include a firewall 106 that protects devices in content distribution network 102. For example, application server 120, registration server 104, live content system 110 and transcoding system 112 may be located behind firewall 106. Firewall 106 may permit or deny transmissions to devices behind firewall 106, for instance, transmissions from application server 120, to other devices, such as device server 108, based on security protocol and authorization procedures.

Network 130 may include one or more wired and/or wireless networks that are capable of receiving, carrying, and transmitting data, voice and/or video signals, including multimedia signals. Network 130 may include one or more 3G or 4G networks. Network 130 may also include one or more wireless/mobile networks and/or a public switched telephone network (PSTN). Network 130 may include one or more wireless networks established by user devices 140. Further, network 130 may include one or more packet switched networks, such as an Internet protocol (IP) based network, a local area network (LAN), a wide area network (WAN), a personal area network (PAN), an intranet, the Internet, or another type of network that is capable of transmitting data. Network 130 may include one or more high-speed data networks, such as a very high performance backbone network services (vBNS) network.

Figure 1B:
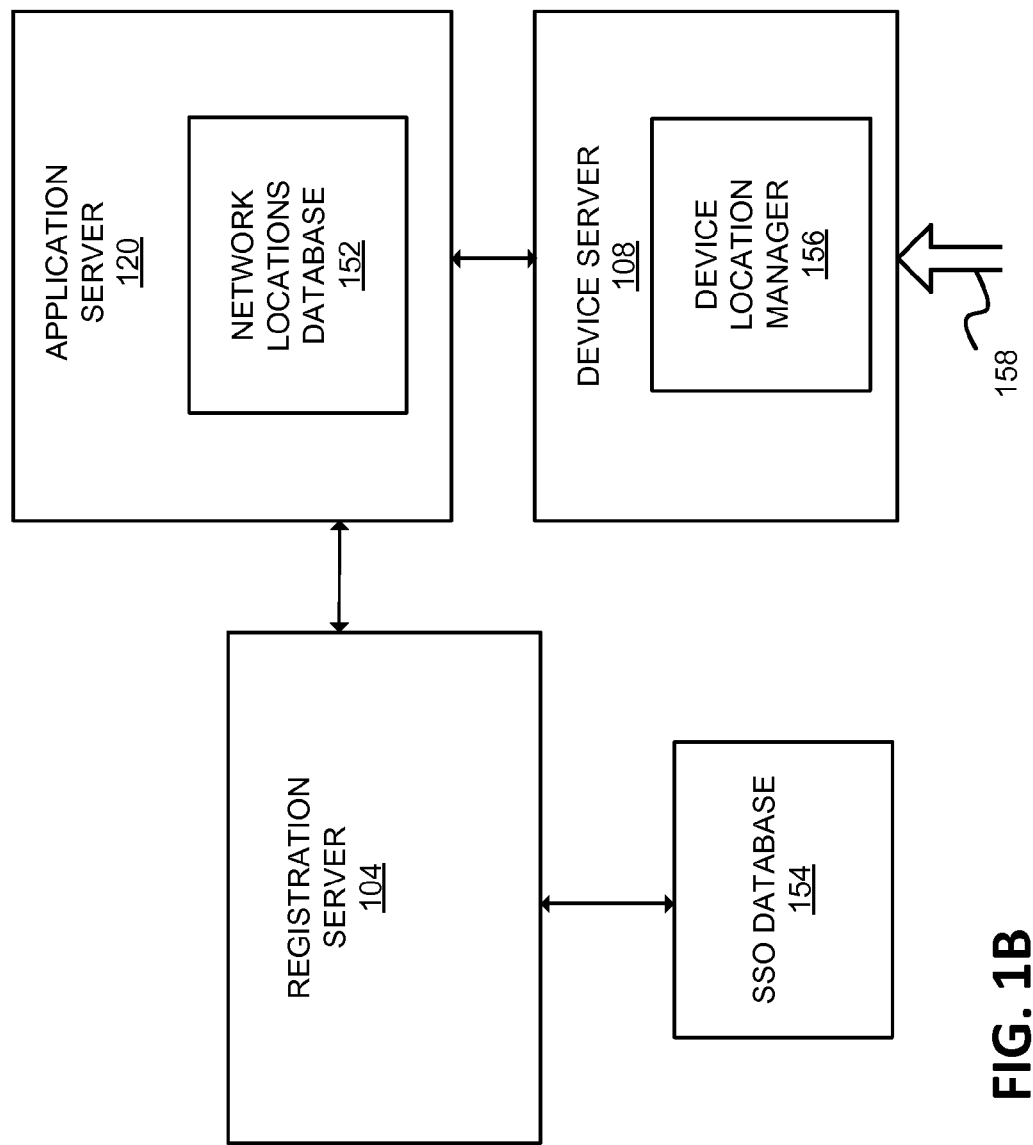
FIG. 1B illustrates a functional block diagram of a network delivery management system.

FIG. 1B illustrates an exemplary functional block diagram of a network delivery management system 150, which is a portion of content distribution network 102. As shown, network delivery management system 150 includes registration server 104, application server 120, and device server 108. The configuration of components of network delivery management system 150 in FIG. 1B is for illustrative purposes. Other configurations may be implemented. Therefore, system 150 may include additional, fewer and/or different components than those depicted in FIG. 1B.

Network delivery management system 150 may provide meta data, authentication, etc., for user devices 140. Network delivery management system 150 may also provide support for optimizing selection of a network to deliver streaming video to user device 140.

Registration server 104 may register user device 140, for instance, via a secure webpage. If user device 140 has been successfully registered with registration server 104, registration server 104 may send a short message service (SMS) to user device 140 with instructions to download a streaming video application that supports optimized selection of a network for delivery of live streaming video. Registration server 104 may also send a separate email with a passcode (e.g., a passcode that includes 4-8 digits) to an email address, associated with user device 140, which may be listed in an SSO database 154. The passcode may be saved on user device 140 during installation of the streaming video application and may be accessed for authentication on each subsequent instance that user device 140 sends a request for streaming video to content distribution network 102.

Application server 120 may support registration of user device 140 in conjunction with registration server 104. Application server 120 may validate user device 140 using identifying information associated with user device 140 and information from a strong security user profile (SSUP) database (not shown). Application server 120 may publish user registration mobile device number (MDN)/pin to device server 108 for authentication during live broadcasting.

Application server 120 may receive administrative input and define network logic for network 100, such as a number of user devices 140 that may register in network 100 (or particular regions of network 100). Further, application server 120 may define predetermined number of user devices 140 that may connect to a mobile tower to avoid congestion, meet service level agreements (SLAs), reduce traffic jams etc.

Application server 120 may also store the locations of landline wireless networks (i.e., a location of a landline wireless device that generates a landline wireless network), mobile wireless networks (i.e., a location of a mobile wireless device that generates a mobile wireless network) and locations of user devices 140 in a database table, for example in locations database 152. Location database 152 may also store other profile information such as device type, capability and video streams playing etc. This profile information may be obtained from the mobile networks or streaming servers or updated through device server 108 by mobile devices. For example, a mobile device may update a global positioning system (GPS) location associated with the mobile device and video streams from periodically. Application server 120 may use the updated GPS location to find the nearest mobile wireless device to provide a video stream for the mobile device using a mobile wireless network established by the mobile wireless device.

Application server 120 may access the stored locations when offloading streaming video content from mobile telecommunications networks to landline wireless networks and/or mobile wireless networks. Application server 120 may provide support for user device 140 to locate landline wireless networks and/or mobile wireless networks, in close proximity to user device 140, over which user device 140 may receive streaming video from content distribution network 102.

Application server 120 may provide locations of landline wireless networks and/or mobile wireless networks based on a location of user device 140.

Device server 108 may communicate (158) with user device 140. Device server 108 (in conjunction with registration server 104) may authenticate user device 140 based on information associated with user device 140, such as a mobile number or a passcode, for instance, received from an email sent by registration server 104 and saved on the handset during registration and application installation. Device server 108 may enforce network logic provided by application server 120. For example, authenticated user devices 140 may receive the video content via a streaming URL, which may be delivered through a secure hypertext transfer protocol secure (HTTPS) connection. User devices 140 that fail the authentication process may not receive the streaming URL.

As further shown in FIG. 1B, device server 108 may include a device location manager 156. Device location manager 156 may support location based functionalities for user device 140. Device location manager 156, in conjunction with application server 106, may locate landline wireless networks and/or mobile wireless networks in close proximity to requesting user device 140. A device may be in close proximity to a network if the device may connect to the network. Device location manager 156 may identify the closest of similar networks (e.g., a closest landline wireless network among multiple landline wireless networks selected based on, for instance, network signal strength) or all networks within close proximity of user device 140. User devices 140 may offload traffic (e.g., streaming video content) from mobile telecommunications networks to landline wireless networks and/or mobile wireless networks. Device location manager 156 may also determine correlations between motions of multiple user devices 140 and, in some implementations, motions of user devices 140 and mobile wireless networks. Device location manager 156 may determine correlations between motions of user devices 140 using tracking information, such as motion vectors associated with each device, cell tower information, etc.

Figure 2A:
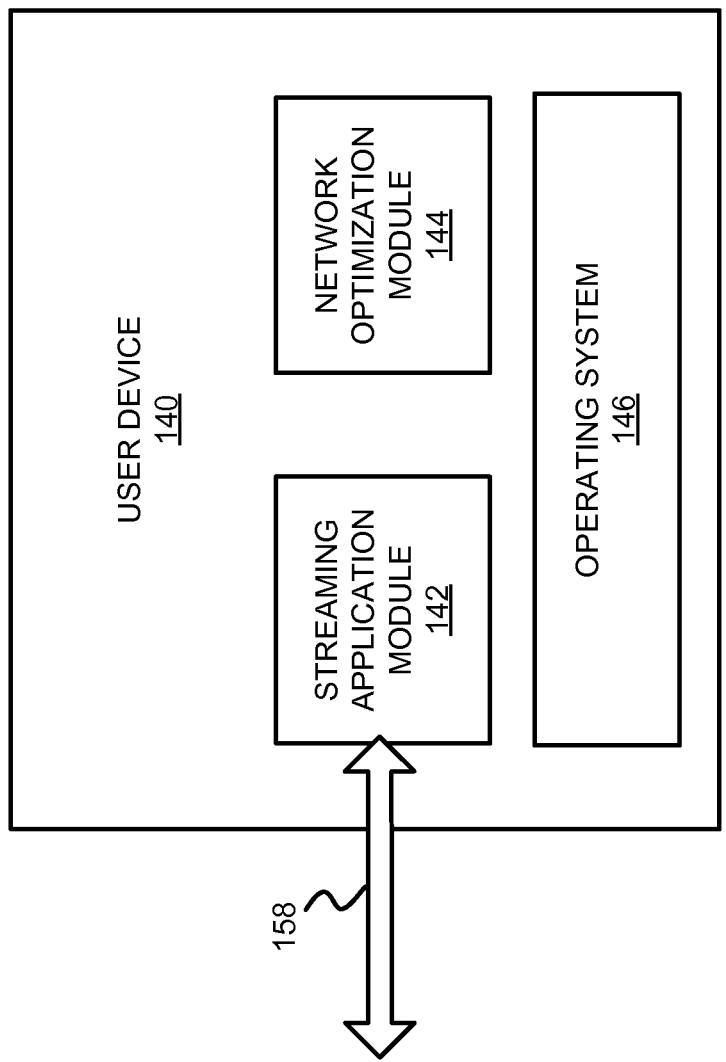
FIGS. 2A and 2B are functional block diagrams of exemplary user devices.
Figure 2B:
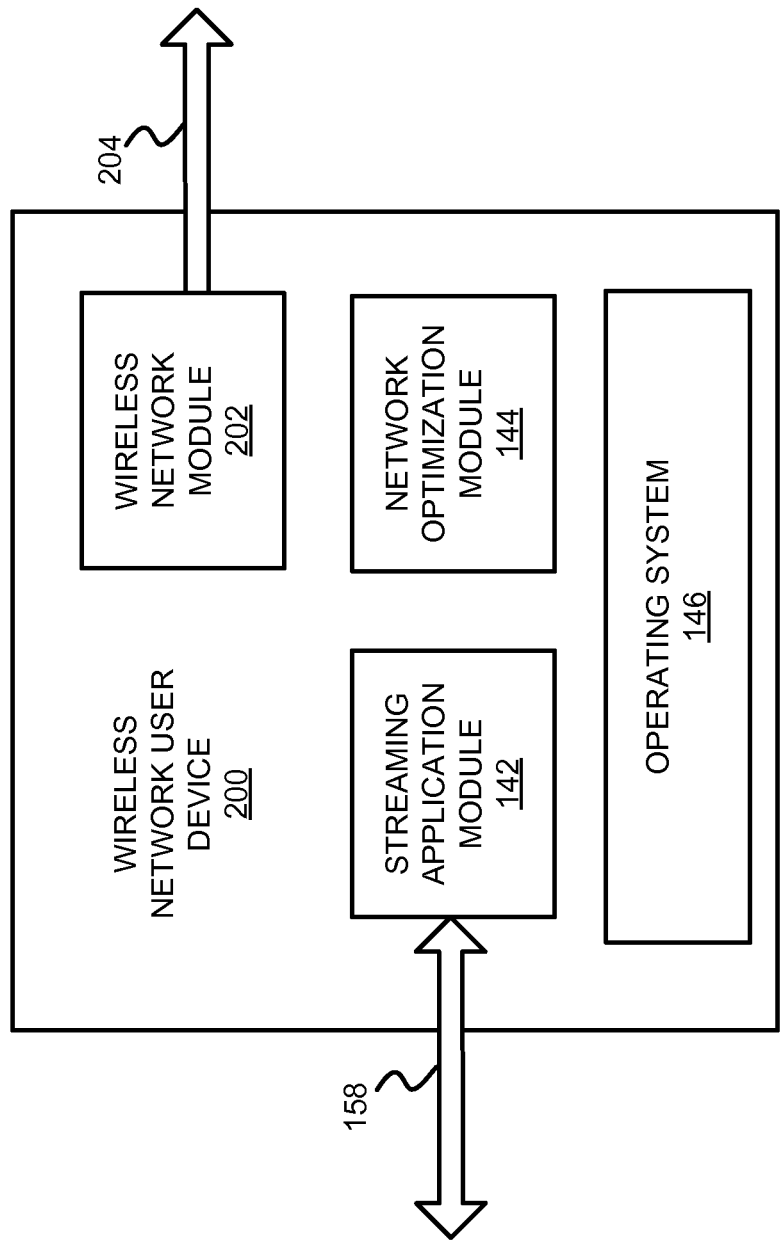

FIGS. 2A and 2B illustrate functional block diagrams of user device 140 (FIG. 2A) and wireless network user device 200 (FIG. 2B). Wireless network user device 200 may be an implementation of user device 140 and as such functionality and features described with respect to user device 140 may be ascribed to wireless network user device 200. User devices 140 and wireless network user device 200 may each include a streaming application module 142, a network optimization module 144, and an operating system (OS) 146. Wireless network user device 200 also includes. However, wireless network user device 200 may also include a wireless network module 202 that is capable of generating a mobile wireless network 204. User device 140 and wireless network user device 200, in conjunction with provider network 102, may optimize selection of a delivery network for streaming video content. The configuration of components of user device 140 and wireless network user device 200 illustrated in FIGS. 2A and 2B is for illustrative purposes. Other configurations may be implemented. Therefore, user device 140 and wireless network user device 200 may include additional, fewer and/or different components than those depicted in FIGS. 2A and 2B.

According to one embodiment, user device 140 (and/or wireless network user device 200) may be a mobile telephone in which OS 146 is a mobile phone operating system, such as an Android operating system (OS), mobile Linux, BlackBerry OS, etc. According to another embodiment, user device 140 may be a computer (e.g. a desktop computer, personal computer, laptop computer, palmtop, or tablet computer). Each embodiment of user device 140 and wireless network user device 200 may include a graphical user interface (GUI) via which a user may select live video content.

Streaming application module 142 may support streaming video content from content distribution network 102 to user device 140, for instance, by performing registration, login, search, and streaming processes for user device 140. Streaming application module 142 may communicate with device server 108 and application server 120 to request and receive streaming video content.

According to one embodiment, streaming application module 142 may connect to device server 108 for authentication. Streaming application module 142 may provide information identifying user device 140 and device server 108, in conjunction with application server 120 and registration server 104, may perform an authentication process using the identifying information provided by streaming application module 142. Device server 108 may provide a streaming URL (if authentication of user device 140 is successful) or an error message (if authentication of user device 140 fails). In one implementation, user device 140 may communicate with device server 108 through an HTTPs connection.

Streaming application module 142 may receive the streaming URL and manage the streaming URL based on a predetermined security protocol. According to one embodiment, a streaming URL may be session based, and may be associated with a token attached to the streaming URL, that limits use of the streaming URL to a single instance. Streaming application module 142 may execute processes that reduce the probability that security associated with the streaming URL may be compromised (e.g., hijacked). Streaming application module 142 may also check with device server 108 at predetermined intervals to ensure that a session for the streaming URL has not expired. If the session for streaming URL has expired, streaming application module 142 may attempt to initiate a new session with content distribution network 102 through interaction with device server 108.

Network optimization module 144 may optimize selection of a network to deliver streaming video content (e.g., via the streaming URL). Network optimization module 144 may identify landline wireless networks, mobile wireless networks, or mobile telecommunications networks that may be used to deliver the streaming video content. User device 140 may be capable of optimizing selection of a network to receive live streaming video content and to play the live streaming video content. The optimized selection of a network to deliver the streaming video content to user device 140 may be transparent to a user of user device 140 (i.e., independent of the user and unapparent to the user) and may be performed by an application on user device 140 in conjunction with content distribution network 102.

Wireless network module 202 (FIG. 2B) may receive a streaming URL and stream the received URL to other user devices 140. In this instance, wireless network module 202 may communicate (158) with device server 108, to provide location information, to enable other user devices 140 and wireless network user devices 200 to use a mobile wireless network that wireless network module 202 generates (204) to receive the streaming video content (i.e., via the streaming URL).

Wireless network user device 200 may receive live streaming using mobile telecommunications network 302. User may view the streaming video content (e.g., on a display associated with wireless network user device 200) and wireless network user device 200 may concurrently stream the video content to nearby user devices 140 and/or wireless network user devices 200. Wireless network user device 200 may also report serving information for mobile wireless network 304 (e.g., Wi-Fi connection information such as SSID, authentication code, and streaming URL for nearby devices to receive the streaming video content) back to device server 108.

Figure 3A:
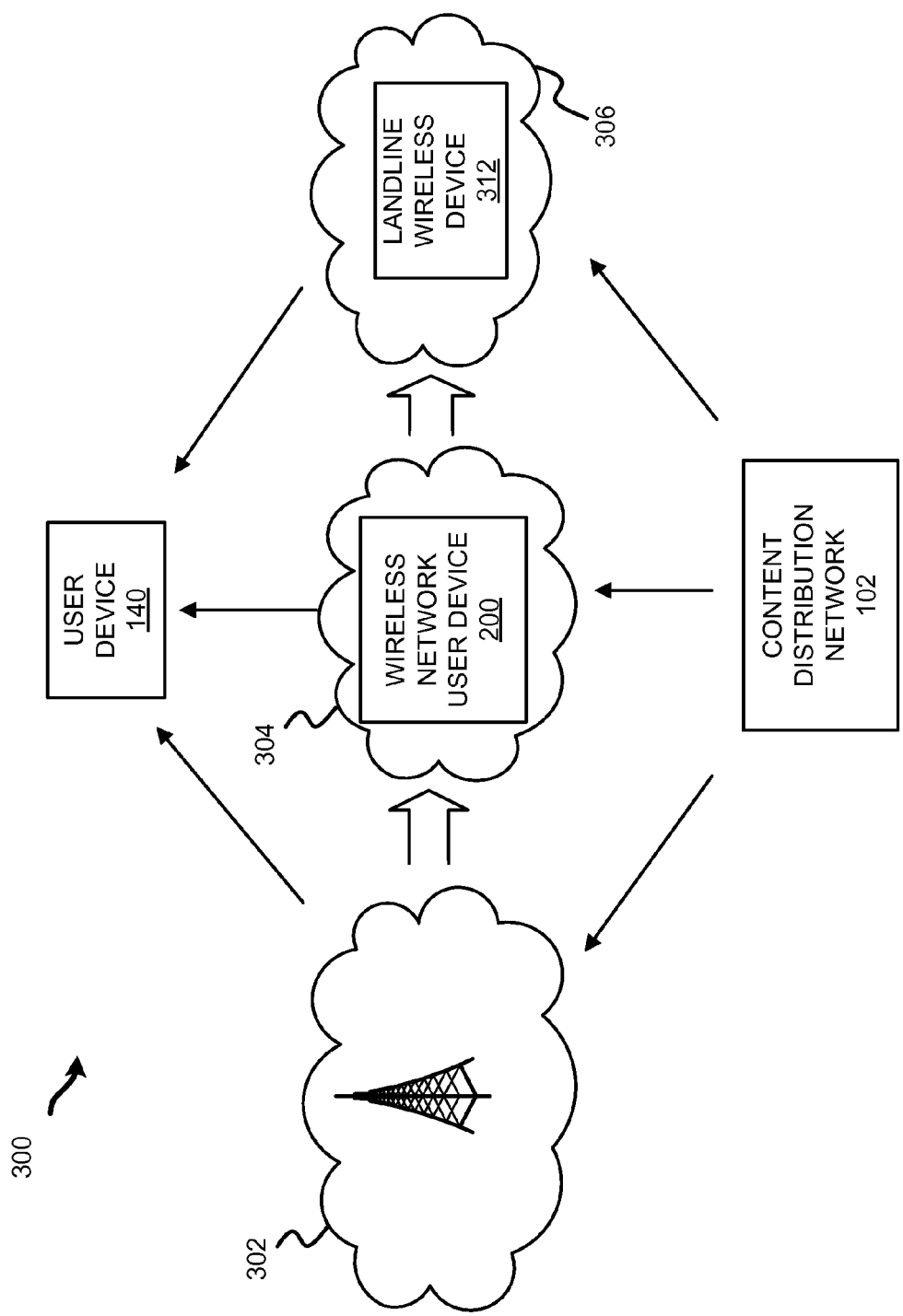
FIGS. 3A and 3B illustrate conceptual implementation of a process for optimizing selection of a network.
Figure 3B:
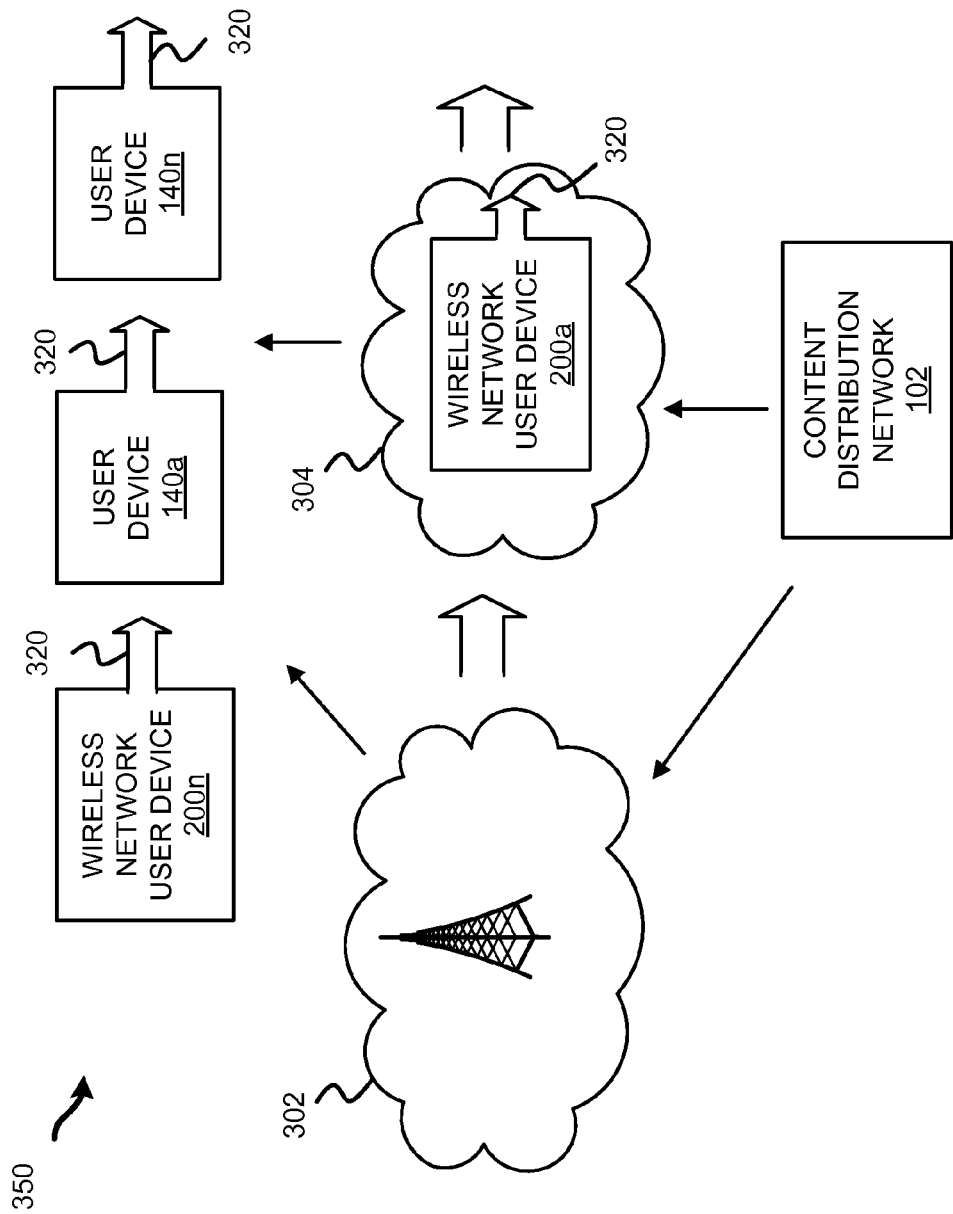

FIGS. 3A and 3B illustrate conceptual implementations 300 and 350 associated with a process for optimizing selection of a network for delivering streaming video content to user device 140 from content distribution network 102. Three types delivery networks are shown in increasing order of preference (or optimality) from left to right; a mobile telecommunications network (e.g., a 3G/4G network) 302 (a lowest preference network), a mobile wireless network (e.g. a Mi-Fi network) 304 (an intermediate preference network), and a landline wireless network 306 (a highest preference network). Landline wireless network 306 may be generated by a landline wireless device 312. Although implementation 300 is described with respect to mobile telecommunications network 302, mobile wireless network 304 and landline wireless network 306, the concepts disclosed may be applied to optimized selection of a network among different types of networks to deliver streaming video content to user device 140.

Device server 108 may monitor user device 140, including a location of user device 140. Application server 120 may store locations of mobile wireless networks 304 and landline wireless networks 306, for example in a table that includes information describing locations and data regarding each mobile wireless network 304 and landline wireless network 306.

Application server 120 may determine a landline wireless network (or networks) 306 that is in closest proximity to user device 140 based on the location of user device 140, for instance, based on a location of a landline wireless device 312 that generates the landline wireless network 306. Application server 120 may output location information for one or more landline wireless networks 306 to user device 140. Similarly, application server 120 may determine mobile wireless networks 304 that are in close proximity to user device 140 and identify these prospective mobile wireless networks 304 to user device 140.

FIG. 3A shows a conceptual implementation in which user device 140 is not in motion (i.e., user device 140 may be stationary or moving within proximity of landline wireless network 306) and landline wireless network 306 is available. A delivery network is available if the delivery network signal is sufficient to support the streaming video content. Landline wireless network 306 may be a preferred delivery network for the streaming video content. Accordingly, user device 140 may receive the streaming video content directly from content distribution network 102 using landline wireless network 306.

User device 140 may not have an established connection to a landline wireless network 306. User device 140 may request information regarding landline wireless network 306 and streaming URL information from device server 108 if there is no established connection to a landline wireless network 306. Device server 108 may identify a landline wireless network 306 in close proximity to user device 140 and return identifying and streaming information (e.g., a Wi-Fi service set identifier (SSID), authentication code and URL) to user device 140 to enable user device 140 to receive the streaming video content from landline wireless network 306. User device 140 may connect to landline wireless network 306 and then use the URL to start streaming the video content from content distribution network 102.

According to another implementation, there are no devices that support a landline wireless network 306 available in close proximity to user device 140. In this instance, if there are also no devices that support a mobile wireless network 304 within close proximity, user device 140 may use mobile telecommunications network 302 to receive streaming video content.

However, if wireless network user device 200 or other devices that support a mobile wireless network 304 are within close proximity of user device 140 (e.g., wireless network user device 200 is within close proximity of devices that are to receive streaming video content), device server 108 may stream the video content to the device that supports a mobile wireless network 304. Wireless network user device 200 may receive the streaming video content from content distribution network 102 through mobile telecommunications network 302 and stream the streaming video content to user device 140 using a mobile wireless network 304.

User devices 140 and/or wireless network user devices 200 may query device server 108 to determine whether there are any landline wireless networks 306 and/or mobile wireless networks 304 available in close proximity that may deliver the streaming video content from content distribution network 102. Device server 108 may check a database table (e.g., network locations database 152) and determine that mobile wireless network 304 generated by wireless network user device 200 is in close proximity and is available for the requesting user devices 140 and/or wireless network user devices 200 (i.e., mobile wireless network 304 may support streaming video content for the requesting device).

Device server 108 may recommend (i.e., provide a recommendation message or other indication of the availability of mobile wireless network 304) that other user devices 140 and/or wireless network user devices 200 connect to wireless network user device 200 through mobile wireless network 304 to receive the streaming video content. Device server 108 may provide network connection information to user devices 140 and/or wireless network user devices 200 (e.g., a Wi-Fi SSID, authentication code and URL for live streaming) based on authentication procedures between wireless network user device 200, device server 108 and the requesting devices, such as user devices 140 and/or wireless network user devices 200. User device 140 may connect to mobile wireless network 304 generated by wireless network user device 200 and begin to receive streaming video content from wireless network user device 200 (for instance output by wireless network module 202 (FIG. 2B)).

FIG. 3B shows a conceptual implementation in which multiple user devices 140 and/or wireless network user devices 200 are in motion. Device server 108 may have the locations of user devices 140 and/or wireless network user devices 200. Device server 108 may detect a number and locations of user devices 140 and/or wireless network user devices 200 and determine whether the requesting devices are substantially moving in a same direction within close proximity to a mobile wireless network 304 generated by wireless network user device 200 (e.g., based on common vectors 320, such as, in a train, plane or automobile). If there are multiple requesting devices moving in a same direction, device server 108 may use mobile wireless network 304 to offload wireless bandwidth consumption, i.e. wireless network user device 200a may receive the live streaming through mobile telecommunications network 302 (e.g., a 3G or 4G network) and stream the video content through mobile wireless network 304 to nearby user devices 140 and/or wireless network user devices 200. Device server 108 may direct wireless network device 200a to provide the streaming video content to devices in close proximity using mobile wireless network 304.

Wireless network user device 200a may receive and display the live streaming video content from the mobile device and provide streaming video content through mobile wireless network 304. Wireless network user device 200a may report information that may enable other devices to receive the streaming video (e.g., Wi-Fi connection information such as SSID, authentication code, and URL for live streaming) back to device server 108 to be saved into an information table for network 100.

User devices 140 and/or wireless network user devices 200 may query device server 108 to determine whether there are any landline wireless networks 306 and/or mobile wireless networks 304 available in close proximity that may deliver the streaming video content from content distribution network 102. Device server 108 may check the database table and determine that wireless network user device 200a is in close proximity and is available for the requesting user devices 140 and/or wireless network user devices 200. Device server 108 may provide network connection information to other user devices 140 and/or wireless network user devices 200 (e.g., a Wi-Fi SSID, authentication code and URL for live streaming). User devices 140 may connect to mobile wireless network 304 generated by wireless network user device 200 and begin to receive streaming video content.

According to another implementation, user device 140 is moving alone. In this instance, user device 140 may be limited to receiving the live streaming video content through a mobile telecommunications network 302 or alternatively, connecting when possible to a landline wireless network 306 or a mobile wireless network 304.

Figure 4:
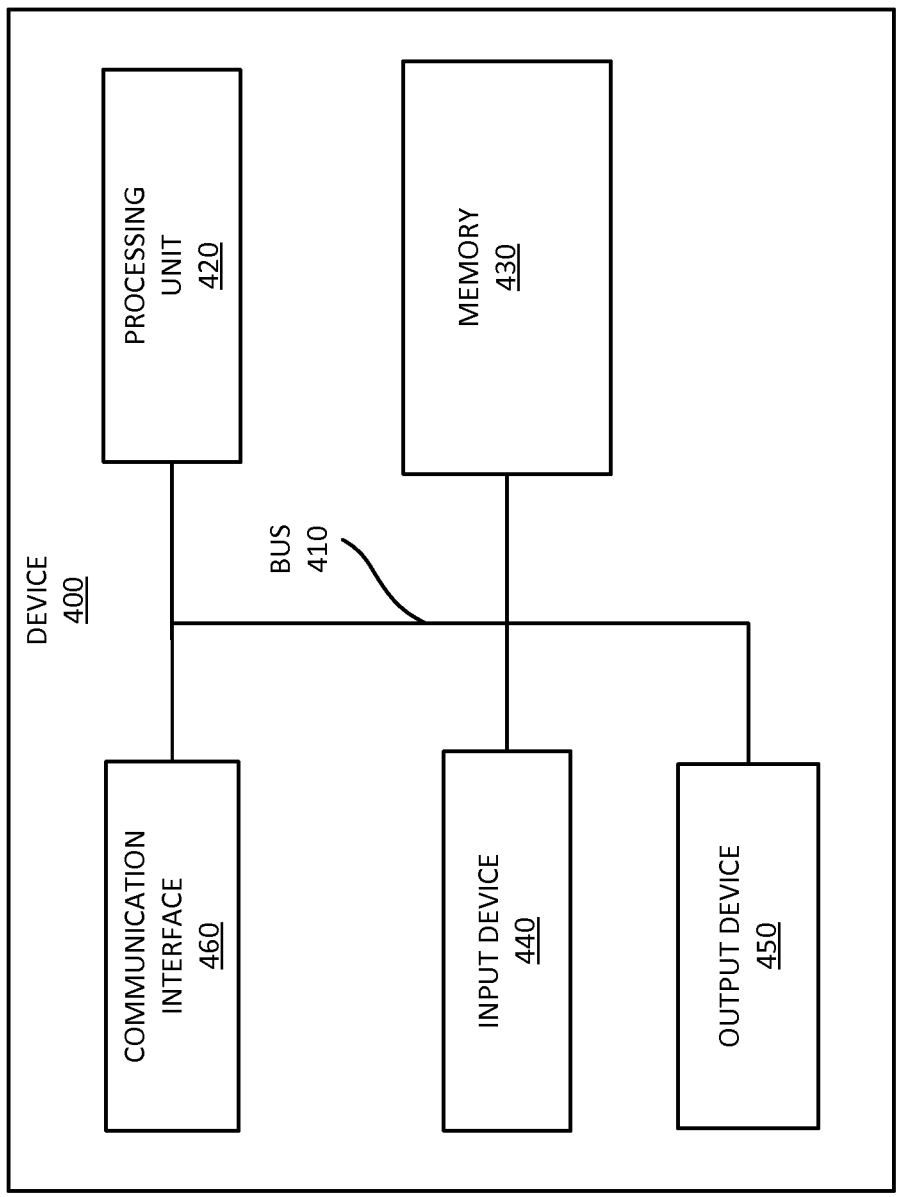
FIG. 4 illustrates an exemplary configuration of one or more of the components of FIG. 1A.

FIG. 4 is a diagram of exemplary components of a device 400. User device 140, wireless network user device 200, registration server 104, application server 120, device server 108, live content system 110, transcoding system 112 or streaming server 114 may include one or more devices 400. As shown in FIG. 4, device 400 may include a bus 410, a processing unit 420, a memory 430, an input device 440, an output device 450, and a communication interface 460.

Bus 410 may permit communication among the components of device 400. Processing unit 420 may include any type of processor or microprocessor that interprets and executes instructions. In other implementations, processing unit 420 may be implemented as or include an application specific integrated circuit (ASIC), field programmable gate array (FPGA), or the like. Memory 430 may include a random access memory (RAM) or another type of dynamic storage device that stores information and instructions for execution by processing unit 420, a read only memory (ROM) or another type of static storage device that stores static information and instructions for processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, a remote, etc. Output device 450 may include a device that outputs information to the operator, such as a display, a speaker, etc.

Communication interface 460 may include a transceiver that enables device 400 to communicate with other devices or systems. Communication interface 460 may include a transmitter that converts baseband signals to radio frequency (RF) signals or a receiver that converts RF signals to baseband signals. Communication interface 460 may be coupled to an antenna for transmitting and receiving RF signals. Communication interface 460 may include a network interface card, e.g., Ethernet card, for wired communications or a wireless network interface (e.g., a Wi-Fi) card for wireless communications.

In an exemplary implementation, device 400 may perform operations in response to processing unit 420 executing sequences of instructions contained in a computer-readable medium, such as memory 430. A computer-readable medium may be defined as a physical or logical memory device. The software instructions may be read into memory 430 from another computer-readable medium (e.g., a hard disk drive (HDD), solid state drive (SSD), etc.), or from another device via communication interface 460. Alternatively, hard-wired circuitry may be used in place of or in combination with software instructions to implement processes consistent with the implementations described herein. Thus, implementations described herein are not limited to any specific combination of hardware circuitry and software.

Figure 5:
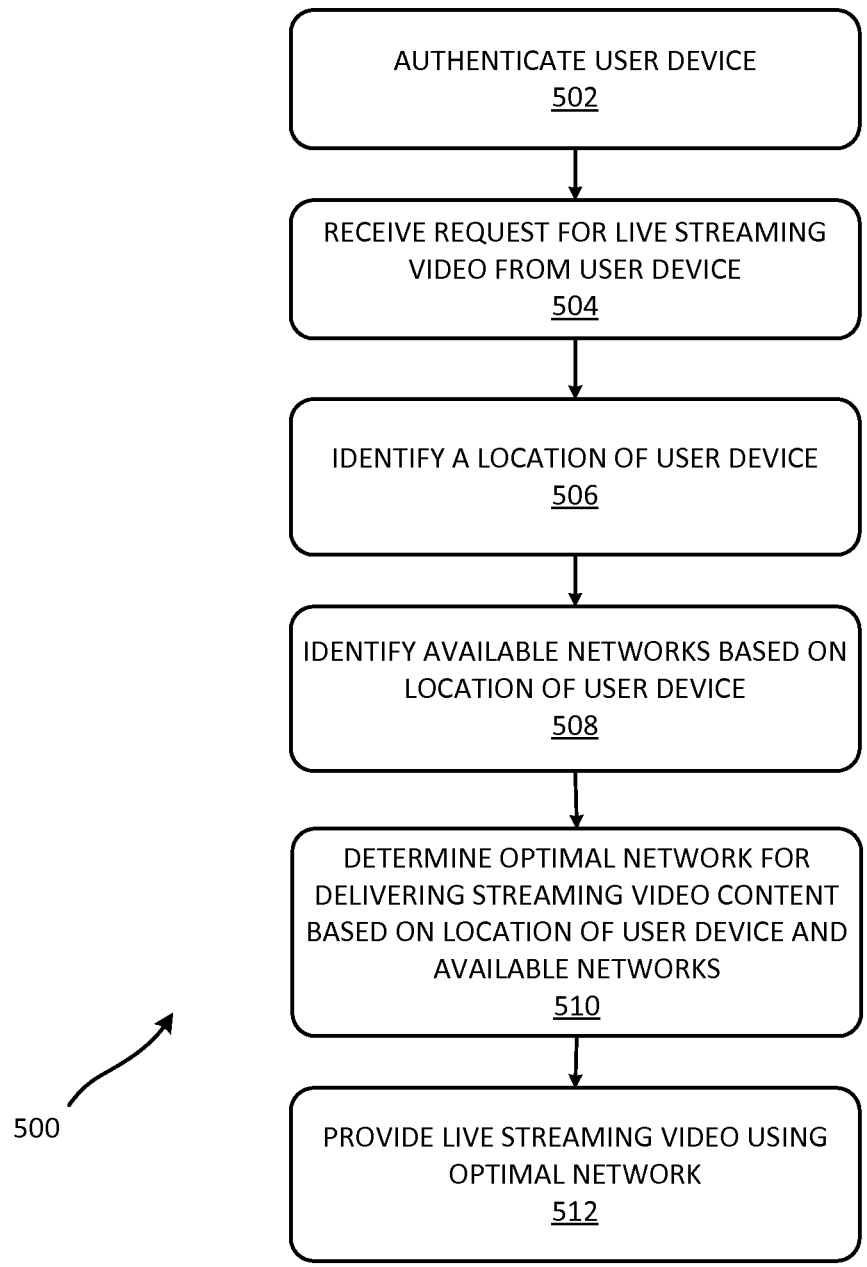
FIG. 5 is a flowchart of an exemplary process for selecting an optimal network for delivering streaming video content to a user device.

FIG. 5 is a flowchart of an exemplary process 500 for optimizing selection of a network to deliver streaming video content to a user device. Process 500 may execute in device server 108. It should be apparent that the process discussed below with respect to FIG. 5 represents a generalized illustration and that other blocks may be added or existing blocks may be removed, modified or rearranged without departing from the scope of process 500.

At block 502, application server 120 may register and authenticate user device 140. For example, application server 120 may communicate with user device 140 through device server 108. Application server 120 may register and authenticate user device 140 in conjunction with device server 108 and registration server 104, for instance as described above with respect to FIG. 1B and network delivery management system 150.

At block 504, application server 120 may receive a request for live streaming video content, for instance from user device 140. For example, user device 140 may output a request for live streaming video to content distribution network 102 that may be received by device server 108 and routed to application server 120.

At block 506, application server 120 may identify a location of user device 140. For example, application server 120 may identify the location of user device 140 based on location information provided by user device 140 and stored in network location database 152.

At block 508, application server 120 may identify available networks based on the location of user device 140. For example, application server 120 may identify available networks within a predetermined proximity of user device 140, or alternatively, determine a closet available network. Application server 120 may identify mobile telecommunications networks 302, mobile wireless networks 304 and/or landline wireless networks 306 that may be used to provide streaming video content to user device 140.

At block 510, application server 120 (in conjunction with user device 140) may optimize a selection of a network to deliver the streaming video content based on a location of user device 140 and available delivery networks in network 100. The optimal network may be determined based on an increasing order of preference from a mobile telecommunications network 302 (a lowest preference network), a mobile wireless network 304 (an intermediate preference network) and a landline wireless network 306 (a highest preference network).

According to one embodiment, application server 120 may determine that a mobile wireless network 304 is to be selected to deliver streaming video content to user device 140 based on the motion of user device 140 and a device that generates the mobile wireless network 304, such as described with respect to FIG. 3B above.

At block 512, content distribution network 102, more particularly streaming server 114, may provide live streaming video content to user device 140 using the optimal network determined by user device 140 in conjunction with device server 108 and application server 120.

Figure 6:
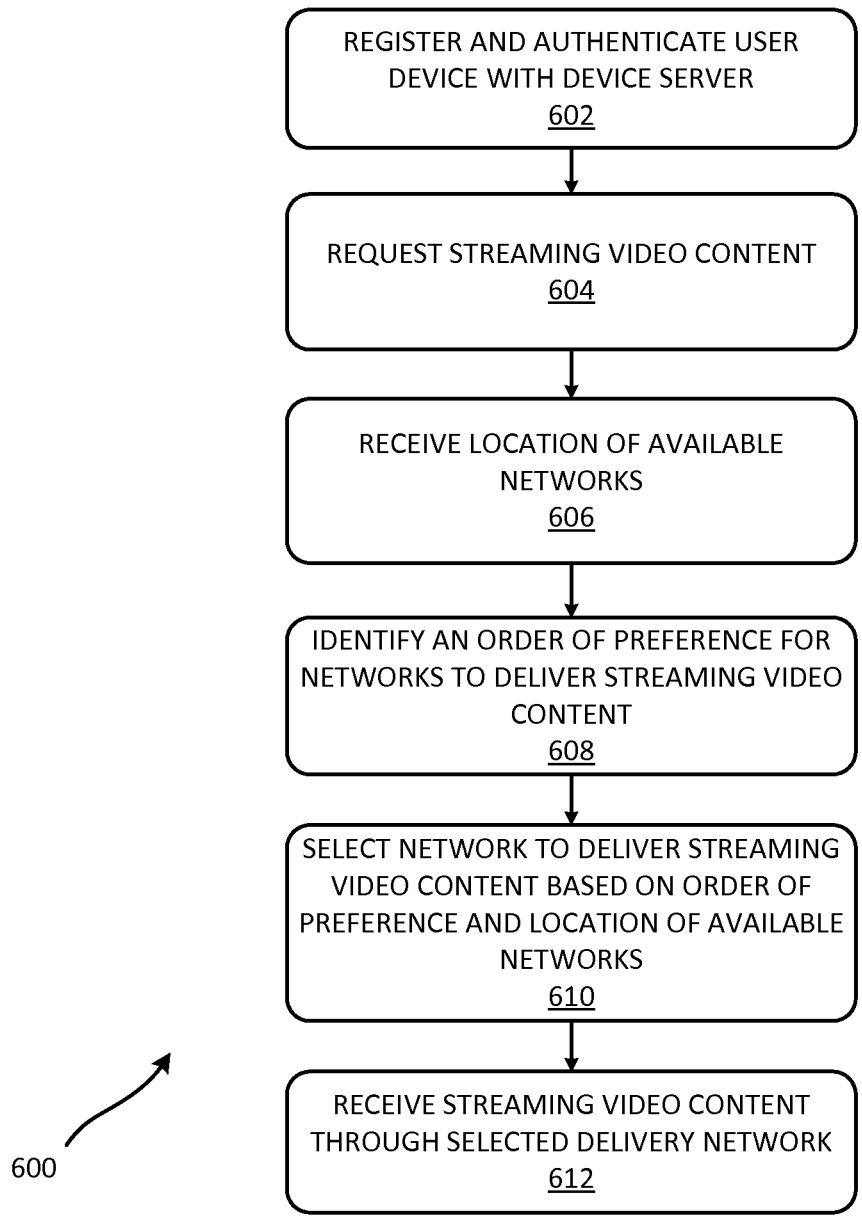
FIG. 6 is another flowchart of an exemplary process for selecting an optimal network for delivering streaming video content to a user device.

FIG. 6 is another flowchart of an exemplary process 600 for optimizing selection of a network to deliver streaming video content to a user device. Process 600 may execute in user device 140. It should be apparent that the process discussed below with respect to FIG. 6 represents a generalized illustration and that other blocks may be added or existing blocks may be removed, modified or rearranged without departing from the scope of process 600.

At block 602, user device 140 may register with content distribution network 102, for instance through device server 108 in conjunction with registration server 104. User device 140 may also be authenticated with content distribution network 102 (e.g., by device server 108 in conjunction with registration server 104).

At block 604, user device 140 may request streaming video content, for example, from content distribution network 102. For example, user device 140 may communicate with device server 108 to request the streaming video content based on input received through a GUI associated with user device 140.

At block 606, user device 140 may receive locations of available networks. For example, application server may determine one or more networks in close proximity to user device 140 that may be used to deliver streaming video content from content distribution network 102. According to one embodiment, user device 140 may receive locations of mobile wireless networks 304 and landline wireless networks 306 in close proximity to user device 140. Application server 120 may have a database table of all locations of mobile wireless networks 304 and landline wireless networks 306 in network 100. Application server 120 in conjunction with user device 140 may use this information to determine a closest network for user device 140.

At block 608, user device 140 may identify an order of preference for networks through which streaming video content is to be delivered. For example, user device 140 may select an optimal network based on an increasing preference order of delivery networks.

At block 610, user device 140 may select a network through which streaming video content is to be delivered based on the order of preference and the locations of available networks. For example, user device 140 may select a network based on an increasing preference order of deliver networks from mobile telecommunications networks, mobile wireless networks 302 and landline wireless networks 306, which are in close proximity to user device 140. User device 140 may select the delivery network based on a network type (e.g., a landline wireless network 306 as the highest order) and other differentiating criteria among networks of the same type, such as strength of signal, security features of the network bandwidth, etc.

At block 612, user device 140 may receive streaming video content through the selected delivery network. For example, streaming server 114 may provide the streaming video content to user device 140 at a streaming URL.

Wireless network user device 200 may perform a process in a similar manner as described with respect to blocks 602-612 above. In the process, wireless network user device 200 may generate mobile wireless network 304 and stream the video content to other user devices 140 and/or other wireless network user devices 200.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIGS. 5 and 6 and content distribution network 102, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to a telecommunications service provider providing applications to a customer, in other implementations, other types of customer-provider relationships may be supported.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
    receiving a request to provide streaming video content from at least one user device, wherein the at least one user device includes a mobile device;
    identifying a location of the at least one user device;
    identifying, by the at least one user device, available networks to deliver the streaming video content based on the location of the at least one user device and locations of a device that generates one or more of the available networks;
    identifying, by the at least one user device, network preference for delivery of the streaming video content, wherein the network preference is an increasing order of preference from a mobile telecommunications network, a mobile wireless network and a landline wireless network;
    selecting an optimal network for delivering the streaming video content based on the location of the at least one user device, the available networks and the network preference for delivery of the streaming video content; and
    providing the streaming video content using the optimal network.

2. The computer-implemented method of claim 1, wherein identifying available networks to deliver the streaming video content comprises:
   determining whether the at least one user device is in motion; and
   identifying the available networks based on one or more mobile telecommunications networks, mobile wireless networks and landline wireless networks in close proximity to the at least one user device in response to a determination that the at least one user device is not in motion.

3. The computer-implemented method of claim 1, wherein the at least one user device comprises a plurality of user devices including a wireless network user device capable of generating a mobile wireless network, further comprising:
   determining whether a landline wireless network is available;
   selecting the wireless network user device from among the plurality of user devices to receive the streaming video content in response to a determination that the landline wireless network is not available; and
   directing the wireless network user device to generate the mobile wireless network, wherein the mobile wireless network is available for delivering the streaming video content to a remainder of the plurality of user devices.

4. The computer-implemented method of claim 1, wherein the at least one user device comprises a plurality of user devices including a wireless network user device capable of generating a mobile wireless network and wherein identifying available networks to deliver the streaming video content further comprises:
   determining whether the plurality of user devices are in motion and in close proximity to each other;
   determining whether the plurality of user devices are in motion in a substantially same direction in response to a determination that the plurality of user devices are in motion;
   selecting the wireless network user device to receive the streaming video content in response to a determination that the plurality of user devices are in motion in a substantially same direction; and
   directing the wireless network user device to generate the mobile wireless network, wherein the mobile wireless network is available for delivering the streaming video content to a remainder of the plurality of user devices.

5. The computer-implemented method of claim 1, wherein providing the streaming video content using the optimal network further comprises:
   providing the streaming video content via a session based streaming uniform resource locator (URL).

6. The computer-implemented method of claim 1, wherein the streaming video content comprises live streaming video content.

7. The computer-implemented method of claim 1, wherein determining the available delivery networks for the streaming video content comprises:
   identifying locations of one or more mobile wireless networks and landline wireless networks;
   identifying the location of the at least one user device; and
   determining the available delivery networks based on close proximity of the identified locations of the one or more mobile wireless networks and landline wireless networks and the identified location of the at least one user device.

8. The computer-implemented method of claim 1, further comprising:
   registering the at least one user device; and
   authenticating the at least one user device.

9. The computer-implemented method of claim 1, further comprising:
   defining network logic for the at least one user device to connect to a network based on one or more of administrative input, network topology and business rules.

10. The computer-implemented method of claim 1, further comprising:
    updating a global positioning system (GPS) location associated with the at least one user device periodically.

11. A device, comprising:
    a memory to store a plurality of instructions; and
    a processor configured to execute instructions in the memory to:
       receive a request to provide streaming video content from at least one user device;
       identify a location of the at least one user device;
       identify available networks to deliver the streaming video content based on the location of the at least one user device and a location of a device that generates one or more of the available networks;
       identify network preference for delivery of the streaming video content, wherein the network preference is an increasing order of preference from a mobile telecommunications network, a mobile wireless network and a landline wireless network;
       select an optimal network for delivering the streaming video content based on the location of the at least one user device, the available networks and the network preference for delivery of the streaming video content; and
       provide the streaming video content using the optimal network.

12. The device of claim 11, wherein, when identifying available networks to deliver the streaming video content, the processor is further configured to:
    determine whether the at least one user device is in motion; and
    identify the available networks based on one or more mobile telecommunications networks, mobile wireless networks and landline wireless networks in close proximity to the at least one user device in response to a determination that the at least one user device is not in motion.

13. The device of claim 12, wherein the at least one user device comprises a plurality of user devices including a wireless network user device capable of generating a mobile wireless network and the processor is further configured to:
    determine whether a landline wireless network is available;
    select the wireless network user device to receive the streaming video content in response to a determination that the landline wireless network is not available; and
    direct the wireless network user device to generate the mobile wireless network, wherein the mobile wireless network is available for delivering the streaming video content to a remainder of the plurality of user devices.

14. The device of claim 11, wherein the at least one user device comprises a plurality of user devices including a wireless network user device capable of generating a mobile wireless network and wherein when identifying available networks to deliver the streaming video content, the processor is further configured to:
    determine whether the plurality of user devices are in motion and in close proximity to each other;

determine whether the plurality of user devices are in motion in a substantially same direction in response to a determination that the plurality of user devices are in motion;

select the wireless network user device to receive the streaming video content in response to a determination that the plurality of user devices are in motion in a substantially same direction; and direct the wireless network user device to generate the mobile wireless network, wherein the mobile wireless network is available for delivering the streaming video content to a remainder of the plurality of user devices.

15. The device of claim 11, wherein when providing the streaming video content using the optimal network, the processor is further configured to:

provide the streaming video content via a session based streaming uniform resource locator (URL).

16. A non-transitory computer-readable medium including instructions to be executed by a processor, the instructions including one or more instructions, when executed by the processor, for causing the processor to:

receive a request to provide streaming video content from at least one user device, wherein the at least one user device includes a mobile device;

identify a location of the at least one user device;

identify available networks to deliver the streaming video content based on the location of the at least one user device and locations of a device that generates one or more of the available networks;

identify network preference for delivery of the streaming video content, wherein the network preference is an increasing order of preference from a mobile telecommunications network, a mobile wireless network and a landline wireless network;

select an optimal network for delivering the streaming video content based on the location of the at least one user device, the available networks and the network preference for delivery of the streaming video content; and provide the streaming video content using the optimal network.

17. The non-transitory computer-readable medium of claim 16, wherein, when identifying the network preference for delivery of the streaming video content, the one or more instructions further includes instructions for causing the processor to:

update a global positioning system (GPS) location associated with the at least one user device periodically.

18. The non-transitory computer-readable medium of claim 16, wherein, when identifying available networks to deliver the streaming video content, the one or more instructions further includes instructions for causing the processor to:

determine whether the at least one user device is in motion; and identify the available networks based on one or more mobile telecommunications networks, mobile wireless networks and landline wireless networks in close proximity to the at least one user device in response to a determination that the at least one user device is not in motion.

19. The non-transitory computer-readable medium of claim 16, wherein, when determining the available delivery networks for the streaming video content, the processor is further configured to:

identify locations of one or more mobile wireless networks and landline wireless networks;

identify the location of the at least one user device; and determine the available delivery networks based on close proximity of the identified locations of the one or more mobile wireless networks and landline wireless networks and the identified location of the at least one user device.

* * * * *